UNITED STATES PATENT OFFICE.

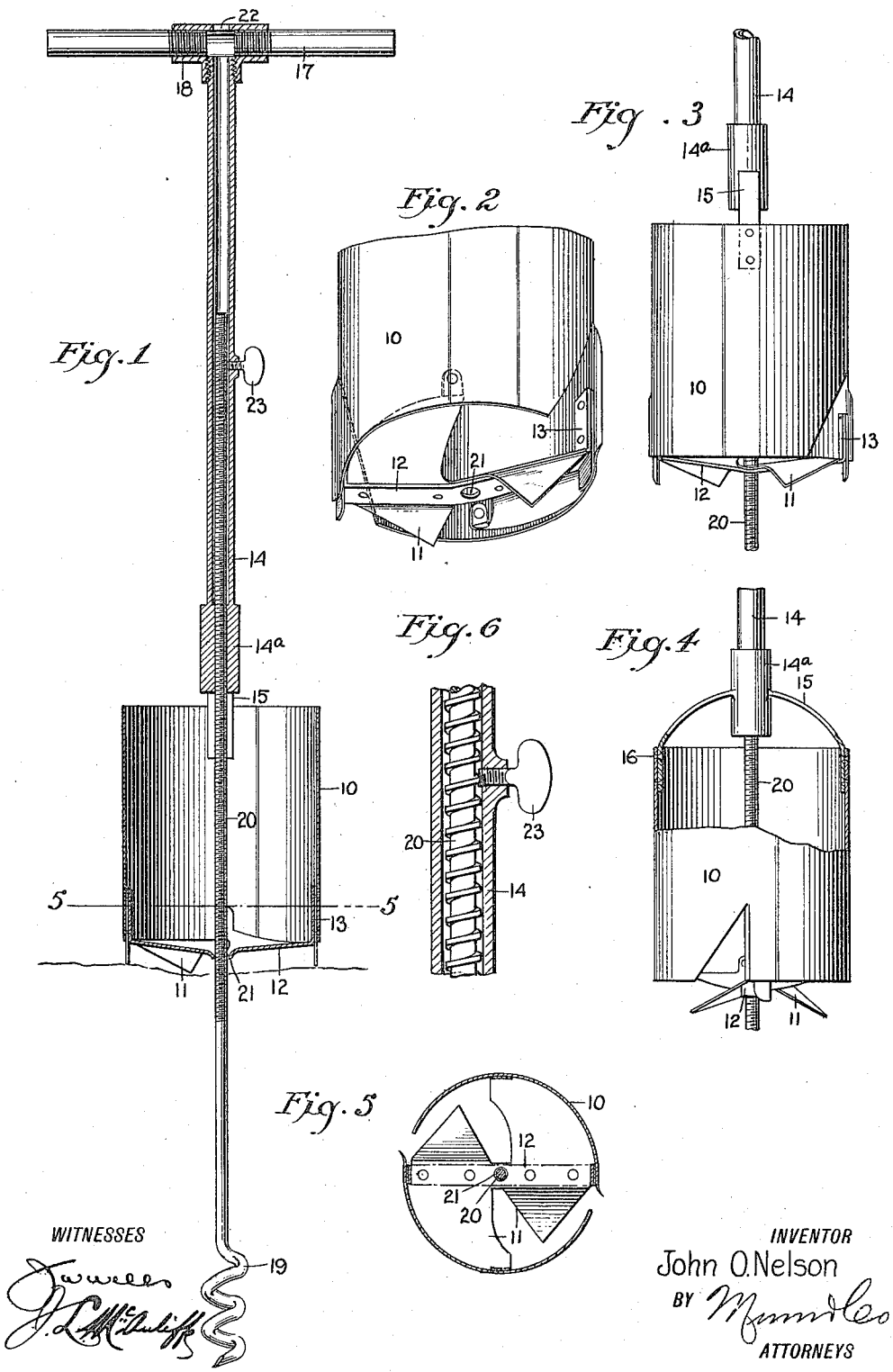
J. O. NELSON.
EARTH AUGER.
APPLICATION FILED JAN. 28, 1915.
1,152,337.
Patented Aug. 31, 1915.
INVENTOR
John O. Nelson

JOHN O. NELSON, OF ONIDA, SOUTH DAKOTA.

EARTH-AUGER.

1,152,337.  Specification of Letters Patent.  Patented Aug. 31, 1915.

Application filed January 28, 1915. Serial No. 4,859.

*To all whom it may concern:*

Be it known that I, JOHN O. NELSON, a citizen of the United States, and a resident of Onida, in the county of Sully and State of South Dakota, have invented a new and Improved Earth-Auger, of which the following is a full, clear, and exact description.

My invention relates to augers for digging post holes, and like work, in which a shell equipped with cutting elements at its lower edge is provided with an elongated handled shank for manipulating the tool.

The prime object of my invention is to provide an earth auger of the indicated character, equipped with a central screw or boring device which may be projected varying distances beyond the main auger to suit either soft or hard ground, the ordinary auger being difficult of effective operation in hard ground.

In carrying out my invention, use is made of an elongated rod formed at its lower end with an earth screw having convolutions of the general form of a cork screw, the said rod extending centrally through the shell of the earth auger and into the handle thereof. Threaded connection is effected between the earth auger and the rod of the auxiliary screw, so that the latter may be brought close to the auger or projected at a considerable distance below the same to be entered in the ground and constitute an anchor so that the turning of the auger about the rod of the earth screw will advance the auger and cause it to effectively and with greater facility enter the ground with the rod of the earth screw as a guide and center.

The invention will be particularly explained in the specific description following.

Reference is had to the accompanying drawings forming part of this specification, in which similar characters of reference indicate corresponding parts in all the views, and in which:

Figure 1 is a vertical section of an earth auger embodying my invention; Fig. 2 is a perspective view of the shell of the earth auger and its cutting elements; Fig. 3 is a fragmentary side elevation; Fig. 4 is a detail sectional side elevation, the view being taken at right angles to Fig. 3; Fig. 5 is a horizontal section on the line 5—5 Fig. 1; and Fig. 6 is a fragmentary vertical section given to show the form of threads on the shank of the earth screw.

In constructing a practical embodiment of my invention in accordance with the illustrated example, the shell 10 of the earth auger may be generally of the usual form and equipped with any suitable cutters 11 at the lower end thereof, said cutters being here shown as connected with a cross bar 12 on the shell and having rearwardly extending tangs or flanges 13 riveted or otherwise suitably secured to said shell.

The shell 10 is provided with an elongated tubular shank 14 which may be connected with the shell through curved arms 15 riveted to the upper end of the shell at diametrically opposite sides as at 16. A cross handle 17 is provided at the top of the tubular shank 14 and may consist of lengths of pipe connected with the tubular shank by a T-coupling 18.

An earth screw 19 having convolutions preferably of the general form of a cork screw is formed on a central elongated rod 20. Said rod 20 extends through a central hole 21 in the cross-bar 12, and above the lower end of the shell 10 threaded connection is established between the rod 20 and the earth auger; in the example shown the tubular shank 14 carrying the shell 10 is thickened as at 14$^a$ and provided with internal threads to engage the threads on the said rod 20. In the figures of the drawing except Fig. 6, the threads of the rod 20 are conventionally shown. From Fig. 6 it will be observed that the screw rod 20 is formed with square threads of long pitch so that a turning of the shell 10 on the said screw rod will advance the shell a material distance for each complete revolution of said shell.

In practice, when soft earth is being excavated, the earth screw 19 is brought close to the cutters 11 of the shell 10 and then serve simply as a centering bit. In this position of the tool the screw rod 20 and shell 10 are locked against relative turning movement by any suitable device as for instance, through the medium of a set screw 23 taking laterally into the tubular shank 14. In the case of hard ground it is well known that an ordinary earth auger is difficult of effective operation. With my device, the set screw 23 is loosened and the screw rod 20 is advanced to project the earth screw 19 thereof a material distance in front of the cutters 11 as indicated in Fig. 1. The said earth screw 19 is then separately entered in the ground, for which purpose the set screw 23 is tightened so that the turning of the handle 17 will turn the screw rod 20 and shank 14 in unison. The earth screw 19 having been entered in the ground to a sufficient depth, the set screw 23 is loosened, and therefore upon turning the handle 17, the shank 14 and shell 10 will turn about the screw rod 20 and advance the said shell along the screw rod. The earth screw 19 in this instance serves as an anchor and the relative turning of the shell will cause the latter to be effectively advanced on the screw rod 20 and to be effectively advanced into the earth.

If a screw rod 20 of considerable length is employed, the cross handle 17 may have a hole 22 in register with the tubular shank 14 to permit the said screw rod to extend through the handle, but this, in ordinary cases, will not be necessary.

Having thus described my invention, what I claim as new and desire to secure by Letters Patent, is:

1. The combination with an earth auger, and means for turning the same, of a central rod on which the auger is adapted to turn and travel, said rod having a screw at its lower end to independently enter the earth.

2. The combination with an earth auger, of a central rod terminating at its lower end in an earth screw, and having threaded engagement with the auger, said auger being adapted to travel on the rod in response to a relative turning movement thereof.

3. The combination of an earth auger, of a central rod on which the auger is adapted to turn and to travel, said rod having guided engagement with the auger near the lower end of the latter and threaded engagement with the auger above said lower end, the lower end of the said rod terminating in an earth screw.

4. The combination of an earth auger, of a central rod on which the auger is adapted to turn and to travel, said rod having guided engagement with the auger near the lower end of the latter and threaded engagement with the auger above said lower end, the lower end of the said rod terminating in an earth screw; together with means to lock the auger and rod to turn in unison.

5. The combination with an earth auger having means for turning the same, of a central screw rod on which the auger is adapted to turn and to travel, said rod having an earth screw at its lower end, and means to lock the auger and screw rod to turn in unison.

6. In an earth auger, a shell having cutting elements at its lower end, a tubular shank on the shell having a handle for turning it, an elongated threaded rod extending entirely through the shell and into the said shank, the said shank having internal threads engaging the rod, and the latter terminating at its lower end in an earth screw, and a set screw to lock the rod and shank against a relative movement.

7. An earth auger comprising an angular shell having cutting means at its lower end, a tubular shank on said shell provided with a handle having a vertical hole in register with the shank, an elongated rod longitudinally movable in said tubular shank and having threaded engagement therewith, said rod terminating at its lower end in a centering earth screw, and means to lock the rod and shank together.

In testimony whereof I have signed my name to this specification in the presence of two subscribing witnesses.

JOHN O. NELSON.

Witnesses:
E. E. HEYWOOD,
CHAS. H. WARNCKE.

Copies of this patent may be obtained for five cents each, by addressing the "Commissioner of Patents, Washington, D. C."